United States Patent [19]

Forrer

[11] Patent Number: 5,670,274
[45] Date of Patent: Sep. 23, 1997

[54] BATTERY STRAP HANDLE

[75] Inventor: Larry L. Forrer, Reading, Pa.

[73] Assignee: Exide Corporation, Reading, Pa.

[21] Appl. No.: 574,186

[22] Filed: Dec. 18, 1995

[51] Int. Cl.$^6$ .............................. H01M 2/02; H01M 2/04
[52] U.S. Cl. .......................... 429/187; 429/121; 429/175; 429/176; 16/DIG. 15; 16/114 R
[58] Field of Search .................................. 429/121, 175, 429/177, 176, 187, 100, 96; 294/158, 903; 16/DIG. 15, 114 R

[56] References Cited

U.S. PATENT DOCUMENTS

| | | |
|---|---|---|
| 921,808 | 5/1909 | Davis . |
| 971,876 | 10/1910 | Apple . |
| 1,908,926 | 5/1933 | Severance . |
| 2,442,705 | 6/1948 | Meyer . |
| 2,501,572 | 3/1950 | Marquez . |
| 2,638,490 | 5/1953 | Snyder ........................ 429/96 |
| 2,913,275 | 11/1959 | La Rocca . |
| 3,093,515 | 6/1963 | Rector . |
| 3,339,794 | 9/1967 | Oberländer . |
| 3,956,022 | 5/1976 | Fox . |
| 4,029,248 | 6/1977 | Lee . |
| 4,039,121 | 8/1977 | Crane . |
| 4,673,625 | 6/1987 | McCartney et al. . |
| 4,861,687 | 8/1989 | Brantley et al. . |
| 5,184,862 | 2/1993 | Theobald . |
| 5,232,796 | 8/1993 | Baumgartner . |
| 5,242,769 | 9/1993 | Cole et al. . |
| 5,283,137 | 2/1994 | Ching . |
| 5,440,785 | 8/1995 | McDonald ........................ 429/187 |

FOREIGN PATENT DOCUMENTS

| | | |
|---|---|---|
| 214232 | 9/1956 | Australia . |
| 1304447 | 8/1962 | France . |
| 2 647 162 | 11/1990 | France . |
| 420735 | 12/1934 | United Kingdom . |
| 1 290 147 | 9/1972 | United Kingdom . |
| 1 494 657 | 12/1977 | United Kingdom . |
| 1 591 401 | 6/1981 | United Kingdom . |

OTHER PUBLICATIONS

Western Auto 1985 Battery Line, brochure, 1985 (no month available).

*Primary Examiner*—Prince Willis, Jr.
*Assistant Examiner*—Carol Chaney
*Attorney, Agent, or Firm*—Nixon & Vanderhye P.C..

[57] ABSTRACT

A storage battery and handle assembly includes a battery housing having a pair of side walls, a pair of end walls, a bottom wall and a cover. Each end wall has a socket formed by a pair of flanges parallel to and spaced from the one end wall, the flanges having edges facing each other and defining a narrow slot therebetween opening into a wider slot formed by the flanges and the end wall. The end wall is also provided with a horizontal rib located below but in general vertical alignment with the wider slot. A flexible strap with relatively rigid connectors at each end thereof is employed, each connector including a plate portion with a strip extending across a bottom of the plate portion, the strip extending beyond side edges and a front face of the plate portion, and lying flush with a back face of the plate portion, thereby forming a smooth horizontal shoulder extending across the front face of the plate portion. The plate portion extends into the wider groove, with the smooth horizontal shoulder in flush engagement with lower edge surfaces of the pair of flanges, and with a lower edge of the strip engaged with a top side of the rib.

13 Claims, 4 Drawing Sheets

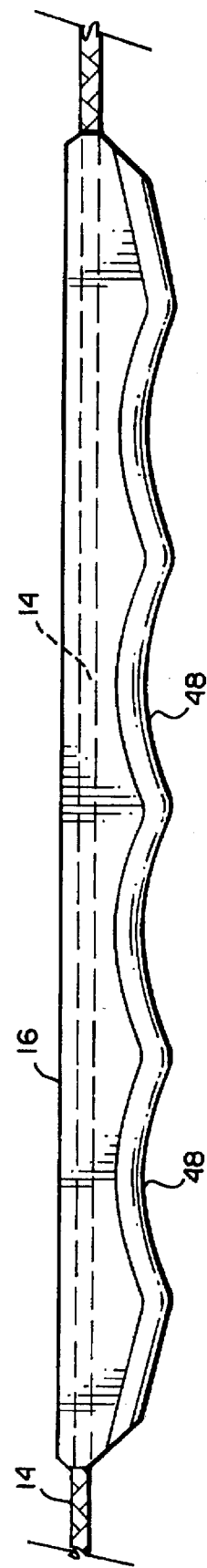

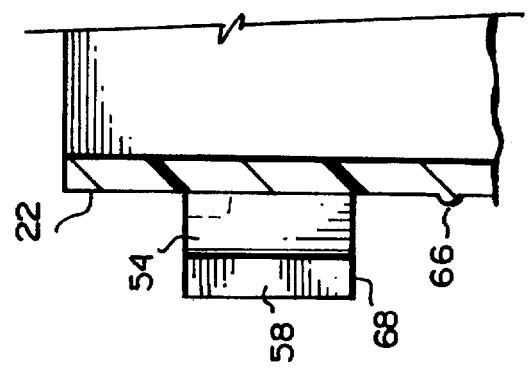
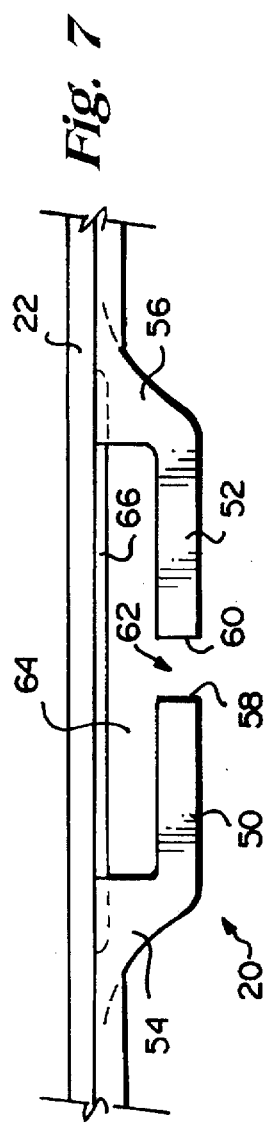
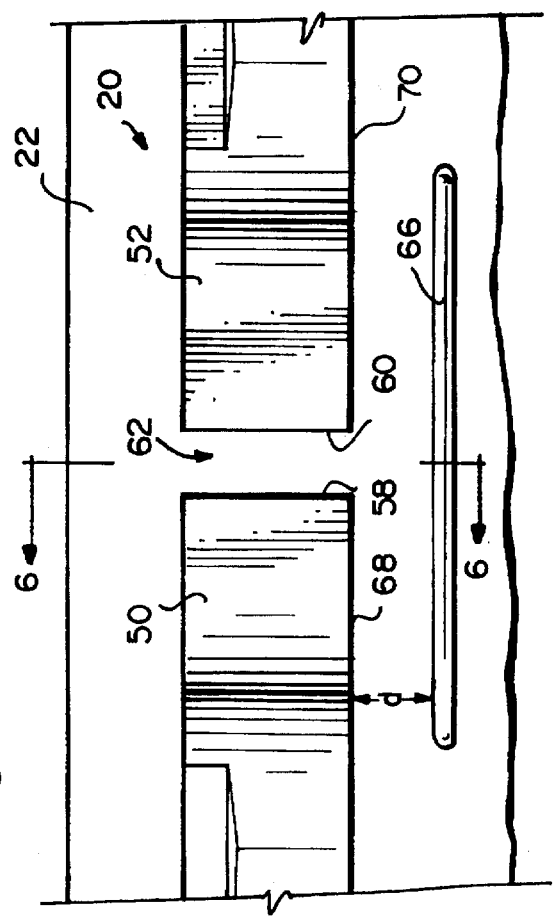

BATTERY STRAP HANDLE

This invention relates to a flexible battery strap type handle for a lead/acid storage battery.

BACKGROUND AND SUMMARY OF THE INVENTION

Storage batteries are typically heavy and difficult to carry. As a result, many carrying devices or handles have been developed to alleviate the problem.

Representative examples in the patent literature include U.S. Pat. Nos. 5,440,785; 5,242,769; and 3,956,022. The handles in each of the above mentioned U.S. patents are relatively inflexible, so they are not easily moved out of the way to allow for unobstructed access to the battery terminals, hold down devices and the like. French publication 2,647,162 discloses a flexible strap type handle which exhibits the desired flexibility, but which does not remain securely attached to the battery under normal conditions.

It is the principal object of this invention to provide an improved strap type handle to facilitate lifting and transporting of storage batteries (primarily but not necessarily automotive and marine), where the handle is attached after battery assembly and becomes an integral part of the battery in that it does not come off under normal lifting or pulling action. In addition, the battery strap handle is sufficiently flexible that it can be moved to an out of the way position for battery shipping, and for installation in a vehicle so as not to interfere with clearances, hold downs or terminal connections. In addition, the battery strap handle is easily removed by the battery owner if so desired.

In accordance with an exemplary embodiment of the invention, a polypropylene fabric web is provided with injection molded polypropylene connectors at either end. These connectors are insertable within sockets molded into place on the end walls of the battery casing.

More specifically, the connectors at opposite ends of the flexible polypropylene strap each include a substantially rectangular plate with a wedge-shaped strip extending laterally across the bottom of the plate. The plate increases slightly in thickness from the fabric strap end toward the lateral strip. This strip projects laterally from both the side edges of the plate as well as from the front face of the plate to thereby define a transverse shoulder extending perpendicularly away from the plate. A bottom flat surface of the strip defines a square corner or edge with the flat back face of the plate. In the preferred arrangement, the connectors are injection molded about the opposite ends of the fabric strap.

In a variation of the exemplary embodiment, a plastic grip may be molded onto the fabric strap, intermediate the opposite ends thereof. A snap on plastic grip handle may also be used.

The sockets formed on opposite end walls of the battery casing each include a pair of laterally extending flanges which lie parallel to the battery end wall but spaced therefrom so as to define a relatively wide slot. In other words, each flange is cantilevered from the casing wall and extends in a direction toward the opposing flange. The flanges terminate at opposing edges which define a narrow slot which opens into the larger or wider slot. A horizontally extending rib is also formed on the end wall, below the flanges by a distance chosen to insure that the laterally extending shoulder of the connector will engage the lower edges of the socket flanges, when the square corner or edge at the bottom of the strip snaps over the rib and into secure but releasable locking engagement with the battery casing.

To attach the strap handle to the battery, the flexible strap is threaded sideways through the narrow slot and into the wider slot, and then pulled upwardly so that the plate of the connector is drawn upwardly into the wider slot until the lower edge of the lateral strip at the lower end of the plate snaps over the laterally extending rib as the shoulder of the lateral strip engages the lower edges of the flanges. The tapered thickness of the plate portion of the connector contributes to the "snap-over" action in that the socket flanges are forced outwardly as the connector is pulled upwardly into the socket and as the lower edge of the connector passes over the rib. The inherent elasticity or resistance in the cantilevered flanges then pushes the connector plate back against the casing wall.

To release the connector from the socket, it is only necessary to exert downward force at the strap/connector interface. In this way, the strap can be removed completely from the battery (by pulling the fabric through the narrow slot), or simply pulled down on either side to an out of the way position where the middle of the strap lies substantially flush with the top cover of the battery, while the fabric strap also extends downwardly through both sockets.

Because of the great flexibility of the fabric strap portion, the latter can also simply be pulled to one side, allowing good access to, for example, the battery terminals.

In accordance with its broader aspects, therefore, the present invention relates to a battery strap handle comprising a flexible strap with relatively rigid connectors at each end thereof, each connector including a plate portion with a strip extending across a bottom of the plate portion, the strip extending beyond side edges and a front face of the plate portion, and lying flush with a flat back face of the plate portion, thereby forming a smooth horizontal shoulder extending across the front face of the plate portion.

In another aspect, the present invention relates to a storage battery and handle assembly comprising a battery housing having a pair of side walls, a pair of end walls, a bottom wall and a cover, each end wall having a socket formed by a pair of flanges parallel to and spaced from the one end wall, the flanges having edges facing each other and defining a narrow slot therebetween opening into a wider slot formed by the flanges and the end wall, the end wall also provided with a horizontal rib located below but in general vertical alignment with the wider slot; and a flexible strap with relatively rigid connectors at each end thereof, each connector including a plate portion with a strip extending across a bottom of the plate portion, the strip extending beyond side edges and a front face of the plate portion, and lying flush with a flat back face of the plate portion, thereby forming a smooth horizontal shoulder extending across the front face of the plate portion, the plate portion lying in the wider groove, with the smooth horizontal shoulder in flush engagement with lower edge surfaces of the pair of flanges, and with a lower edge of the strip engaged with a top side of the rib.

Other objects and advantages of the subject invention will become apparent from the detailed description which follows.

BRIEF DESCRIPTION OF THE DRAWINGS

FIG. 4 is a partial elevation of the battery strap handle incorporating a plastic grip in accordance with an optional feature the subject invention;

FIG. 5 is a partial side elevation of a battery casing end wall formed with a strap handle receiving socket in accordance with the invention;

FIG. 6 is an end elevation, partly in section, taken along the line 6—6 of FIG. 5; and FIG. 7 is a plan view of FIG. 5.

DETAILED DESCRIPTION OF THE DRAWINGS

Figure 1:
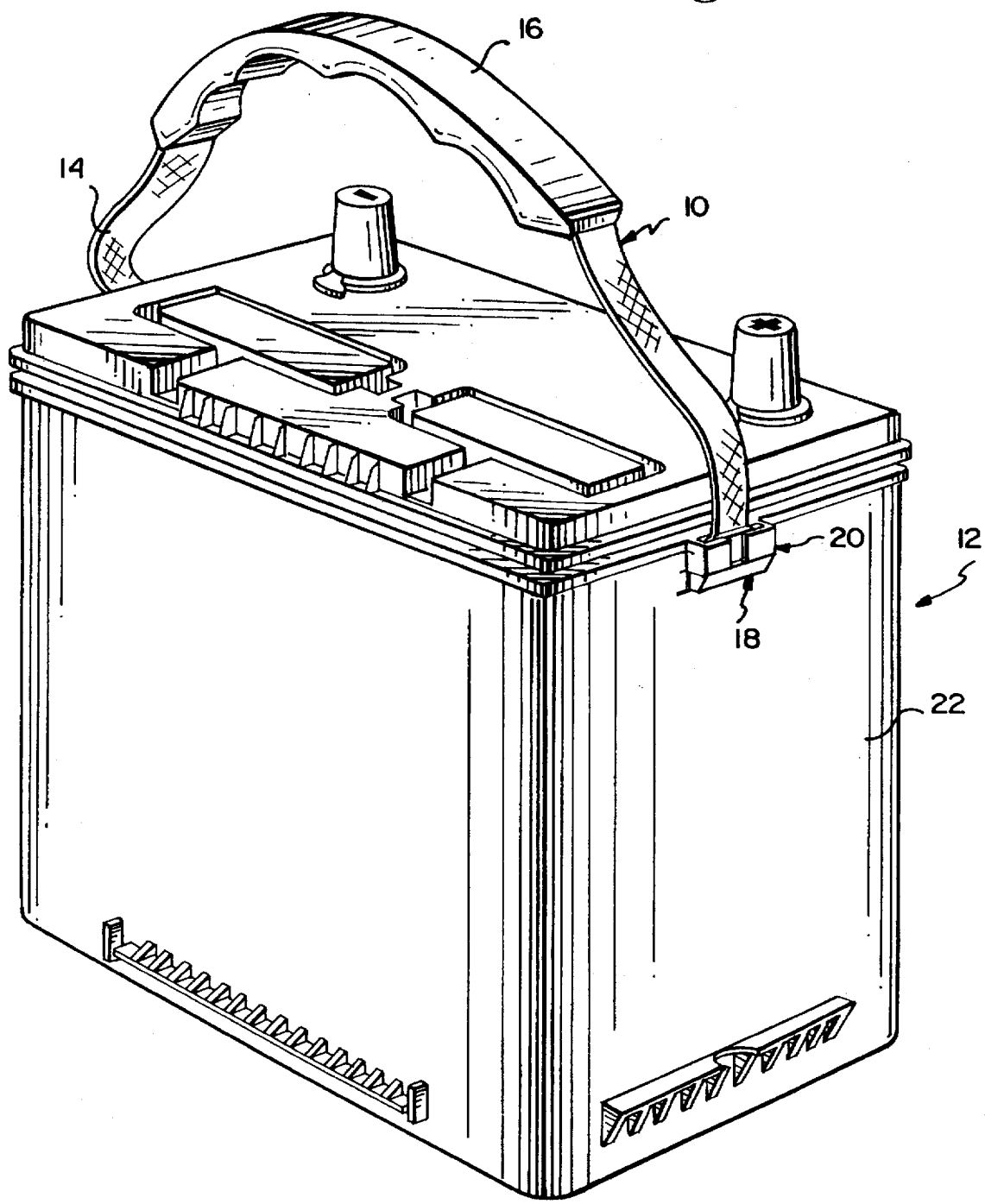
FIG. 1 is a perspective view of a storage battery incorporating a strap type handle in accordance with an exemplary embodiment of the invention.

With reference initially to FIG. 1, a battery strap handle 10 is shown attached to an otherwise conventional automotive (or marine) storage battery 12. The strap handle 10 includes a flexible strap 14 which may be a woven polypropylene fabric (or other appropriate material) and may include a molded-in-place or snap on plastic grip 16 (optional). Injection molded connectors (one shown at 18) are applied at opposite ends of the strap 14, and are designed to snap into sockets (one shown at 20) molded into the end walls (one shown at 22) of the battery 12.

In the description of the invention, reference to upper, lower, front, back, vertical, horizontal, etc. are used for purposes of convenience, and with reference to the strap and battery in a normal upright orientation as shown in FIG. 1.

Figure 2:
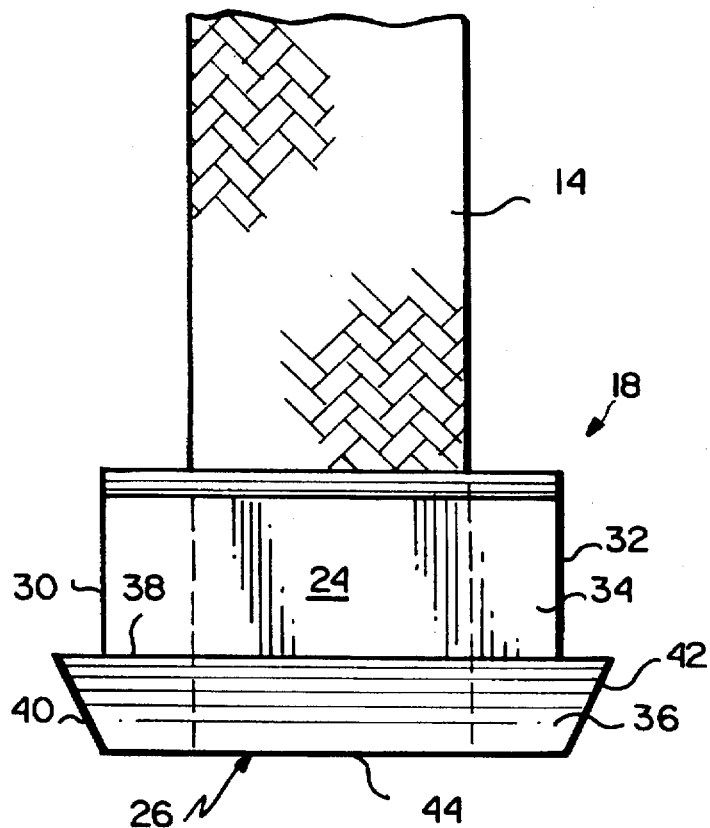
FIG. 2 is a partial side elevation of the strap handle in accordance with the invention.
Figure 3:
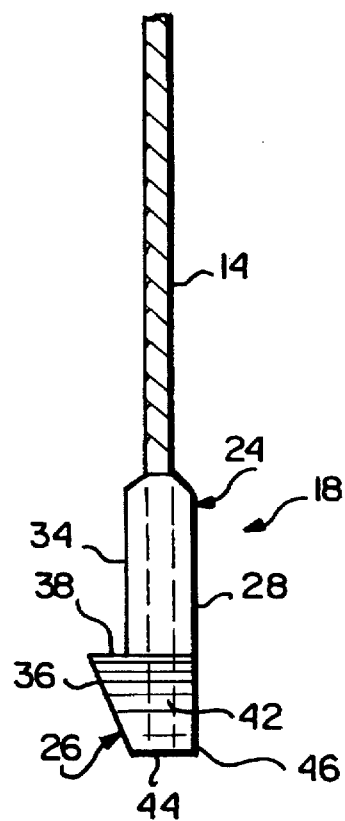
FIG. 3 is an end elevation of FIG. 2.

Referring now to FIG. 2. The connectors 18 are identical and each includes a substantially rectangular plate portion 24, with a wedge-shaped horizontally projecting strip 26 extending laterally across the bottom of the connector. This strip lies flush with the back side 28 of the plate portion 24, but projects laterally from both side edges 30, 32 and from the front face 34 thereof. The strip 26 includes a tapered front face 36, tapering inwardly and downwardly from a transverse shoulder 38, and tapered edges 40, 42, also tapering inwardly and downwardly. A bottom, flat surface 44 of the strip defines a square corner or edge 46 with the back face 28 of the connector. In a preferred arrangement, the connector 18 is injection molded about the end of the fabric strap 14.

The plastic grip 16 (FIG. 4) may be molded to include a series of transverse finger grooves 48 which facilitate gripping the strap, but this is not a required component of the strap handle. Here again, it is preferred that, if used, the handle grip 16 be molded in place about the strap 14.

Turning to FIGS. 4–7, one of the sockets 20 will now be described in detail. Each socket 20 is formed by a pair of laterally extending flanges 50, 52, which lie parallel to the battery end wall 22, but spaced therefrom by webs 54, 56, i.e., the flanges are cantilevered from the casing wall and extend toward each other. The flanges 50, 52 terminate at opposing edges 58, 60 which define a narrow slot 62 which opens to a larger slot 64 formed by reason of space between the flanges 50, 52 and the end wall 22. A horizontally extending rib 66 is formed in the end wall 22, having a length substantially equal to the length of the connector strip 26. The rib 66 is spaced below the flanges 50, 52 a distance "d" (FIG. 5) which is critical to the successful utilization of the strap handle. Specifically, distance "d" is chosen to insure that shoulder 38 of the connector 18 will engage the lower edges 68, 70 of the flanges 50, 52, respectively, when the edge 46 of the connector snaps over the rib 66 (see FIG. 1), as described in further detail below.

To attach the strap handle 10 to the battery 12, the flexible fabric strap 14 is "threaded" sideways through the narrow slot 62, into the wider slot 64 and then pulled upwardly so that the plate portion 24 of the connector 18 is drawn upwardly into the slot 64, until edge 46 snaps over the rib 66, as the shoulder 38 engages edges 68, 70 of the socket 20. Note that the plate portion 24 is slightly tapered so that as the plate 24 is pulled upwardly into the socket, the plate biases the flanges 50, 52 slightly outwardly, so that as the edge 46 rides over the rib 66, the flanges 50, 52 will resiliently bias the plate back against the end wall 22 so as to releasably secure the connector 18 within the socket. This procedure can be carried out simultaneously for both connectors 18 by pulling upwardly in the middle of the strap 14 (or on grip 16).

The connector 18 can be disengaged from the socket 20 simply by pressing downwardly at a location where the flexible fabric 14 joins the connector 18. The force will easily overcome the resistance of rib 66 and allow the connector to move downwardly out of the socket. The fabric strap 14 can then be moved out of the slot 64 via slot 62 for removal of the strap handle if desired. Alternatively, the connectors 18 may be pulled downwardly on either side of the casing end walls 22, leaving the fabric strap 14 to slide within the sockets 20, to simply move the strap handle to an out of the way position.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A battery strap handle comprising a strap with connectors at each end thereof, each connector including a plate portion having flat front and back sides, a pair of side edges and a bottom, with a horizontally projecting strip extending across the bottom of the plate portion, said strip extending beyond said side edges and the front side of the plate portion, and lying flush with the flat back side of the plate portion, said strip thereby providing a horizontal shoulder extending outwardly from and across the front side of the plate portion, said shoulder having a continuous flat surface extending between lateral side edges of said horizontally projecting strip.

2. The battery strap handle of claim 1 wherein said horizontally projecting strip increases in thickness continuously from an end remote from said strap toward said horizontal shoulder.

3. The battery strap handle of claim 1 wherein said horizontally projecting strip has a tapered front face and tapered side edges.

4. The battery strap handle of claim 1 wherein said strap is provided with a handle grip intermediate the ends thereof.

5. The battery strap handle of claim 1 wherein said strap comprises polypropylene.

6. The battery strap handle of claim 5 wherein said strap comprises woven polypropylene fabric.

7. The battery strap handle of claim 4 wherein said handle grip is made of plastic.

8. A storage battery and handle assembly comprising:
a battery housing having a pair of side walls, a pair of end walls, a bottom wall and a cover, each end wall having a socket formed by a pair of flanges parallel to and spaced from said one end wall, said flanges having mutually opposed end faces and defining an entry opening into a slot between said flanges and said end wall, said end wall also provided with a horizontally elongated rib located below but in general vertical alignment with said slot; and a strap with connectors at each end thereof, each connector including a plate portion having flat front and back sides, a pair of side edges and a bottom, with a horizontally projecting strip extending across the bottom of the plate portion, said strip extending beyond said side edges and the front side of the plate portion, and lying flush with the flat back side of the plate portion, said horizontal projecting strip thereby providing horizontal shoulder extending outwardly from and across the front side of the plate portion, said plate portion lying in said slot, with said horizontal shoulder in flush engagement with lower edge surfaces of said pair of flanges, and with a lower edge of said horizontally projecting strip engaged with a top side of said horizontally elongated rib, thereby releasably locking the connector within the slot.

9. The battery strap handle of claim 8 wherein said horizontally projecting strip increases in thickness continuously from an end remote from said strap toward said horizontal shoulder.

10. The storage battery and handle assembly of claim 8 wherein said strap is provided with a handle grip intermediate the ends thereof.

11. The storage battery and handle assembly of claim 8 wherein said strap comprises polypropylene.

12. The battery strap handle of claim 11 wherein said strap comprises woven polypropylene fabric.

13. The storage battery and handle assembly of claim 10 wherein said handle grip is made of plastic.

* * * * *